US009801073B2

(12) United States Patent
Cordeiro et al.

(10) Patent No.: US 9,801,073 B2
(45) Date of Patent: Oct. 24, 2017

(54) METHOD FOR IMPROVING SELF-COEXISTENCE OF WIRELESS COMMUNICATION NETWORKS

(75) Inventors: Carlos Cordeiro, Ossining, NY (US); Kiran Challapali, New City, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1331 days.

(21) Appl. No.: 12/066,860

(22) PCT Filed: Sep. 16, 2006

(86) PCT No.: PCT/IB2006/053296
§ 371 (c)(1),
(2), (4) Date: Mar. 14, 2008

(87) PCT Pub. No.: WO2007/031960
PCT Pub. Date: Mar. 22, 2007

(65) Prior Publication Data
US 2008/0253341 A1 Oct. 16, 2008

Related U.S. Application Data

(60) Provisional application No. 60/733,518, filed on Nov. 4, 2005, provisional application No. 60/718,127, filed on Sep. 16, 2005.

(51) Int. Cl.
*H04W 4/00* (2009.01)
*H04W 16/14* (2009.01)
*H04W 72/12* (2009.01)

(52) U.S. Cl.
CPC ........ *H04W 16/14* (2013.01); *H04W 72/1257* (2013.01)

(58) Field of Classification Search
CPC .......................... H04W 16/14; H04W 72/1257
(Continued)

(56) References Cited

U.S. PATENT DOCUMENTS 5,574,979 A * 11/1996 West .................... H04B 1/1027
375/356
5,732,077 A * 3/1998 Whitehead .......... H04W 52/286
370/349
(Continued)

FOREIGN PATENT DOCUMENTS

DE 10350890 A1 9/2005
EP 1473956 A2 11/2004
(Continued)

OTHER PUBLICATIONS

Internet Citation, "Functional Requirements for the 802.22 WRAN Standard", Aug. 2005, XP002425031 URL:www.ieee802.org/22/Meeting_documents/2005_Aug_teleconferences/22-05-007-39-0000_RAN_Requirements.doc.

*Primary Examiner* — Abdelnabi O Musa
(74) *Attorney, Agent, or Firm* — Larry Liberchuk

(57) ABSTRACT

Self-coexistence of first and second wireless communication networks (200) is improved by transmitting a coexistence beacon from a first station (210, 220) of the first wireless communication network (200) to a first station (210, 220) of the second wireless communication network (200. The coexistence beacon includes information about a traffic reservation of the first station (210, 220) of the first wireless communication network (200). The first station (210, 220) of the second wireless communication network (200) may then use this information in a variety of ways to reduce data collisions between the two networks (200). It can communicate this information to a base station (210) of the second wireless communication network (200). The base station (210) of the second wireless communication network (200) can then use this information to more efficiently allocate frequency channels and/or time slots for future traffic res-
(Continued)

ervations of the first station (220) of the second wireless communication network (200).

12 Claims, 3 Drawing Sheets

(58) Field of Classification Search
USPC ............ 370/338, 310.2, 328, 322, 348, 433; 455/450, 464, 509, 511, 515
See application file for complete search history.

(56) References Cited

U.S. PATENT DOCUMENTS

| | | | |
|---|---|---|---|
| 7,177,294 B2 * | 2/2007 | Chen ................. | H04W 72/1215 370/338 |
| 7,215,659 B1 * | 5/2007 | Chen et al. .................... | 370/338 |
| 7,324,491 B1 * | 1/2008 | Benveniste ............. | H04L 12/66 370/338 |
| 2002/0009070 A1 * | 1/2002 | Lindsay et al. ............... | 370/347 |
| 2002/0173272 A1 * | 11/2002 | Liang ................ | H04W 72/1215 455/63.1 |
| 2003/0012167 A1 | 1/2003 | Benveniste | |
| 2003/0053437 A1 * | 3/2003 | Bahl et al. ..................... | 370/345 |
| 2003/0186713 A1 | 10/2003 | Sugaya | |
| 2004/0028003 A1 * | 2/2004 | Diener ................. | H04L 1/0001 370/319 |
| 2004/0248568 A1 | 12/2004 | Lucidarme | |
| 2005/0058151 A1 * | 3/2005 | Yeh ....................... | H04W 52/46 370/445 |
| 2005/0208956 A1 * | 9/2005 | Takagi ............. | H04W 74/0808 455/464 |
| 2006/0114826 A1 * | 6/2006 | Brommer ............. | H04J 3/1682 370/230 |
| 2011/0007724 A1 * | 1/2011 | Mahany et al. .............. | 370/338 |

FOREIGN PATENT DOCUMENTS

| | | |
|---|---|---|
| JP | 2003259429 A * | 9/2003 |
| JP | 2003289576 A | 10/2003 |
| WO | WO0141492 A1 | 6/2001 |

* cited by examiner

METHOD FOR IMPROVING SELF-COEXISTENCE OF WIRELESS COMMUNICATION NETWORKS

This invention pertains to the field of wireless communication networks, and more particularly to a method for improving the ability of multiple centrally controlled wireless communication networks of the same type to exist in adjacent or overlapping geographical areas.

With the emergence of unlicensed wireless services, overlapping operation of multiple centrally controlled wireless networks sharing the same frequency spectrum has become commonplace. Together with the proliferation of wireless services and the increasing scarcity of radio resources, interference amongst various collocated wireless networks has become a problem hindering the development and threatening the future of wireless services which share the same frequency spectrum. This problem is hereby termed: "self-coexistence."

One possible solution to mitigate the self-coexistence problem is to employ Listen-Before-Talk (LBT) protocols (e.g., carrier sense multiple access).

However, many services require Quality of Service (QoS) guarantees. In those cases, reservation-based protocols are required to provide those QoS guarantees. Meanwhile, LBT-based solutions are not at all sufficient when the protocol allows for reservations. When the protocol allows for reservation of the airtime at pre-determined time intervals, a lack of coordination among collocated (or closely located) wireless communication networks may disrupt their operations.

FIG. 1 illustrates an example of a scenario where collocation of wireless communication networks leads to data collisions. In this figure, nodes A and B set up a QoS traffic reservation that overlaps in time and frequency with another QoS traffic reservation of nodes C and D. Hence, the reservations collide, and node B will never correctly receive the packet sent from node A, as it always gets corrupted by the transmission from C to node D. Note that mechanisms such as request to send (RTS)/clear to send (CTS) do not overcome the problem, as the nodes in FIG. 1 are communicating with QoS reservations where LBT and RTS/CTS do not apply. In addition, under certain conditions such as large propagation delays, LBT protocols are inadequate due to their poor performance.

Therefore, a major problem in existing reservation-based (e.g., Time Division Multiple Access (TDMA)) wireless technologies is that when there are multiple overlapping networks of the same type in operation, performance is significantly degraded. Existing wireless technologies based on reservations to provide QoS guarantees, such as IEEE 802.16, IEEE 802.11e (i.e., the contention-free reservations), and IEEE 802.15.1/3/4 (i.e., the contention-free reservations), all experience a drop in performance (although to different degrees) whenever the operation of multiple networks overlap. This is primarily due to the fact, as explained above, that reservations of stations belonging to different collocated networks are uncoordinated and thus overlap in time and frequency, which results in data packet collisions and poor performance. In addition, this can be aggravated by two other factors. First, depending on the type of traffic, reservations made to a station can last for a considerable amount of time, which may lead to repeated collisions with other reservations or transmissions of collocated networks. Secondly, as the radio transmission range increases, the negative effect of overlapping networks also increases due to a greater interference range.

Accordingly, it would be desirable to provide a method of improving self-coexistence of two or more wireless communication networks operating in neighboring or overlapping geographical areas. It would also be desirable to provide a method of allowing multiple collocated wireless networks to coordinate resource reservation and hence operate more efficiently.

In one aspect of the invention, a method of improving self-coexistence of first and second wireless communication networks comprises: listening at a first station of the first wireless communication network for a coexistence beacon; receiving at the first station of the first wireless communication network a coexistence beacon transmitted from the first station of the second wireless communication network, the coexistence beacon including information about a traffic reservation of the first station of the second wireless communication network; and communicating coexistence information from the first station of the first wireless communication network to a second station of the first wireless communication network, the coexistence information being produced from the information about the traffic reservation of the first station of the second wireless communication network included in the received coexistence beacon, wherein the first and second wireless communication networks operate in proximity to each other in at least one overlapping frequency channel and with overlapping transmission times.

In another aspect of the invention, a method of improving self-coexistence of first and second wireless communication networks comprises: requesting a traffic reservation at a first station in a first wireless communication network; receiving a traffic reservation at the first station in the first wireless communication network; and transmitting a coexistence beacon from the first station in the first wireless communication network to a first station in a second wireless communication network, wherein the first and second wireless communication networks operate in proximity to each other in at least one overlapping frequency channel and with overlapping transmission times, and wherein the coexistence beacon includes information about the traffic reservation of the first station in the first wireless communication network.

In a further aspect of the invention, a method of improving self-coexistence of first and second wireless communication networks comprises: receiving at a first station of the first wireless communication network a coexistence beacon transmitted from a first station of the second wireless communication network, the coexistence beacon including information about one or more traffic reservations of one or more remote stations of the second wireless communication network; and selecting one or more parameters of one or more traffic reservations for one or more remote stations of the first wireless communication network based on the information received by the first station of the first wireless communication network about the one or more traffic reservations of one or more remote stations of the second wireless communication network.

While various principles and features of the methods and systems described below can be applied to a variety of communication systems, for illustration purposes the exemplary embodiments below will be described in the context of unlicensed wireless communication networks operating with reservation-based (e.g., TDMA) protocols.

More particularly, the exemplary embodiments described below pertain to centralized wireless communication networks which are each characterized by a Base Station (BS) and a plurality of remote stations (RS) communicating with reservation-based protocols. In this type of arrangement, the BS regulates the medium access within its network in both downstream (DS) and upstream (US) directions, which is done through media access control (MAC) layer functions. In addition, as the multiple collocated wireless communication networks discussed below typically do not belong to the same operator, the existence of a wired backbone connecting BSs and which could facilitate self-coexistence typically does not exist. However, the methods and techniques described below could also be applied in the case of distributed access networks using reservation-based protocols and even through a wired backbone. Of course, the scope of the invention is defined by the claims appended hereto, and is not limited by the particular embodiments described below.

With this in mind, we now describe methods by which BSs and RSs belonging to different wireless communication networks can improve their self-coexistence.

Figure 1:
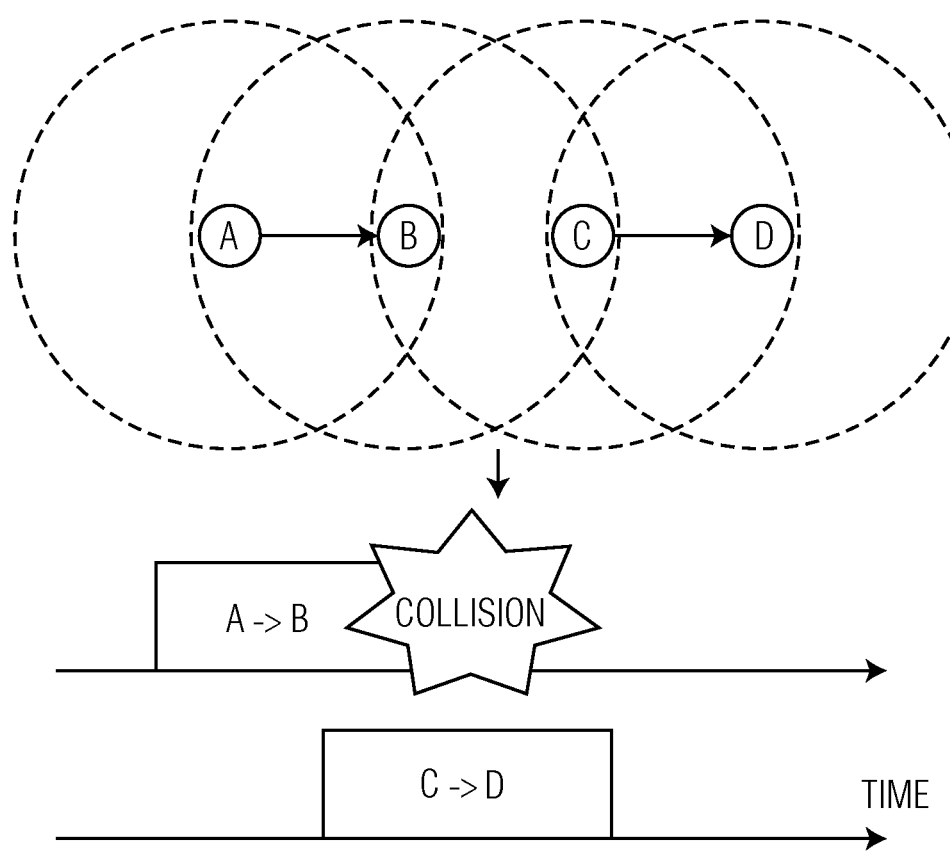
FIG. 1 illustrates a scenario where traffic reservations of two collocated wireless communication networks collide.
Figure 2:
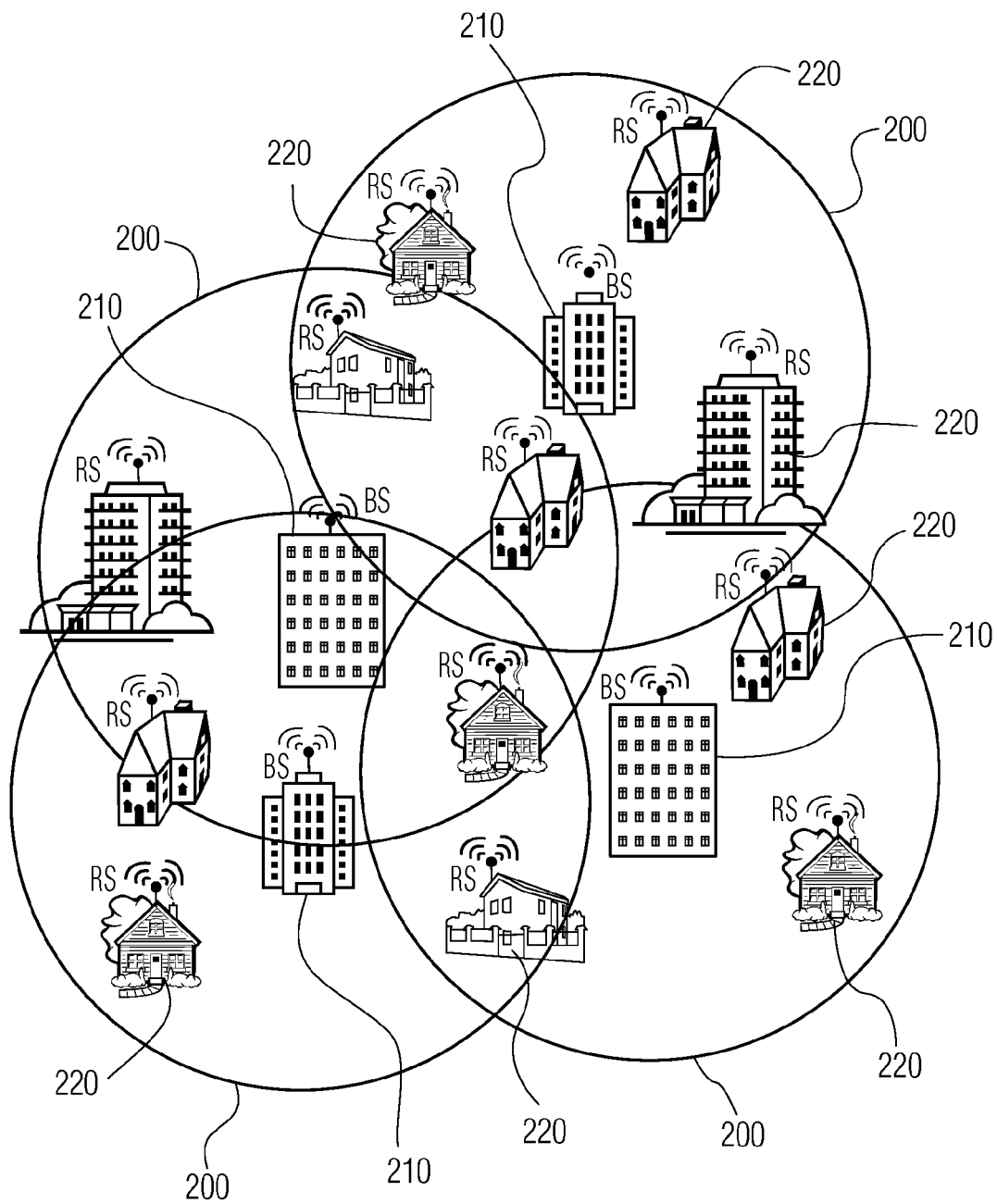
FIG. 2 shows a number of overlapping wireless communication networks.

FIG. 2 shows a plurality of wireless communication networks 200 operating in proximity to each other. Each wireless communication network 200 includes one base station (BS) 210 and a plurality of remote stations (RS) 220. Each RS 220 could be fixed or mobile. In one exemplary embodiment, the wireless communication networks 200 each comprise a wireless regional area network (WRAN), for example providing broadband Internet access, voice or video services to the RSs 220.

When we say that two wireless communication networks 200 operate in proximity to each other, we mean that at least one station 210/220 of one of the networks 200 is located sufficiently close to at least one station 210/220 of the other network 200 that data packets transmitted to or from one of the stations 210/220 of the first network can collide with or interfere with data packets transmitted to or from one of the stations 210/220 of the second network 200 so as to prevent their proper reception.

In general, the wireless communication networks 200 operate in one or more overlapping frequency channels and with overlapping data transmission times. When we say that the wireless communication networks 200 operate with overlapping data transmission times, we mean broadly that at least one BS 210 or RS 220 of a first wireless communication network 200 can transmit during a time period (e.g., a time slot) which overlaps a time period (e.g., a time slot) during which at least one BS 210 or RS 220 of a second wireless communication network 200 can also transmit. As can be seen from FIG. 2, self-coexistence is a major issue when multiple wireless communication networks 200 overlap their operation (i.e., airtime resource allocation) in time and frequency, particularly in the case where the wireless communication networks 200 are unlicensed. Traffic reservations of two different wireless communication networks 200 that overlap in frequency and time can collide, leading to corrupted data. Although FIG. 2 shows a case where the operating or coverage areas of the wireless communication networks 200 actually overlap, self-coexistence collisions can also occur when the operating areas do not overlap, but are located in proximity to each other such that a transmission by an RS 210 of a first wireless communication network 200 can interfere with the reception of data transmitted to or from an RS 220 of a second wireless communication network 200.

Beneficially, to mitigate these self-coexistence problems, in accordance with a coexistence beacon protocol (CBP) each RS 220 in the wireless communication networks 200 of FIG. 2 is capable of transmitting a coexistence beacon which includes information about one or more traffic reservations of the RS 220. Beneficially, the coexistence beacons also include other information about the wireless communication network 200 to which the transmitting RS 220 belongs, such as a frame size used in the wireless communication network 200, a number of frames per superframe in the wireless communication network 200, etc. These coexistence beacons are intended for inter-network communication and beneficially carry specific information about the wireless communication network 200, and DS/US frequency channel and time slot of traffic reservations, associated with the RS 220. The information in the coexistence beacons can be used to allow collocated wireless communication networks 200 to achieve efficient self-coexistence, as will be explained in greater detail below.

Table 1 below presents an example of the contents that can be included in a coexistence beacon packet. Beneficially, the payload of a coexistence packet contains information about the traffic reservations of the transmitting station. For example, a coexistence beacon sent by RS 220 would include information about the DS and US traffic reservations of RS 220 with its BS 210.

TABLE 1

Example of fields in the header of a coexistence beacon packet

| Syntax | Size | Notes |
| --- | --- | --- |
| Beacon_MAC_Header_Format( ) { | | |
| HT | 1 bit | Header Type to distinguish between different types of headers |
| Length | 8 bits | The length in bytes of the MAC PDU including the MAC header and the CRC |
| FS | 7 bits | Frames per Superframe (in case superframes are used) Indicates the number of frames within a superframe. Typically, frames have a fixed size which preferably does not change. |
| Frame Number | 8 bits | The number of the frame where the coexistence beacon is transmitted |

TABLE 1-continued

Example of fields in the header of a coexistence beacon packet

| Syntax | Size | Notes |
|---|---|---|
| Frame Duration | 8 bits | Indicates the time duration of the frame |
| Frame Offset | 16 bits | Indicates the offset (in units of symbol duration) relative to the start of the first symbol of the PHY PDU (including preamble) where the current frame (i.e., the beacon itself) is transmitted. The time instants indicated by the Frame Offset values are the transmission times of the first symbol of the beacon including preamble (if present). |
| RS ID | 48 bits | Address that uniquely identifies the RS |
| BS ID | 48 bits | Address that uniquely identifies the BS |
| Channel Number | 8 bits | The initial channel number that is used by this RS's BS |
| Number of Channels | 8 bits | The number of channels used by this RS's BS |
| HCS | 8 bits | Header check sequence |
| } | | |

Table 2 below presents an example of typical beacon information element (IE) included by RS 220 in its transmitted coexistence beacons. A coexistence beacon can include multiple beacon IEs.

TABLE 2

Example of Beacon IE

| Syntax | Size | Notes |
|---|---|---|
| RS_Beacon_IE_Format( ) { | | |
| Element ID | 8 bits | For identification purposes |
| Length | 8 bits | The length of this IE |
| Direction | 1 bit | Indicates whether this reservation is for US direction (set to 0) or DS direction (set to 1) |
| Reserved | 4 bits | Reserved |
| Frame Offset | 16 bits | Indicates the offset (in units of symbol duration) of this RS's reservation with the BS (whether DS or US) relative to the start of the first symbol of the PHY PDU (including preamble) where the frame is transmitted. The time instants indicated by the Frame Offset values are the transmission times of the first symbol of the RS reservation including preamble (if present). |
| Duration | 16 bits | Indicates the duration (in units of symbol duration) of this RS's reservation with the BS (whether DS or US) |
| CoS | 3 bits | Indicates the priority of the reservation |
| Channel Number | 8 bits | The channel initial number of this reservation |
| Number of Channels | 8 bits | The number of channels that this reservation spans |
| } | | |

Beneficially, in the wireless communication networks 200 of FIG. 2, each BS 210 schedules coexistence beacon transmissions by its RSs 220. When scheduling a coexistence beacon, BS 210 determines not only the time period(s) when coexistence beacon(s) shall be transmitted, but also which RSs 220 (or BS 210 itself) shall transmit the coexistence beacons. In contrast, in the case of a wireless communication network having a decentralized architecture, the scheduling of coexistence beacon transmissions may be distributed among the stations in the network.

Figure 3:
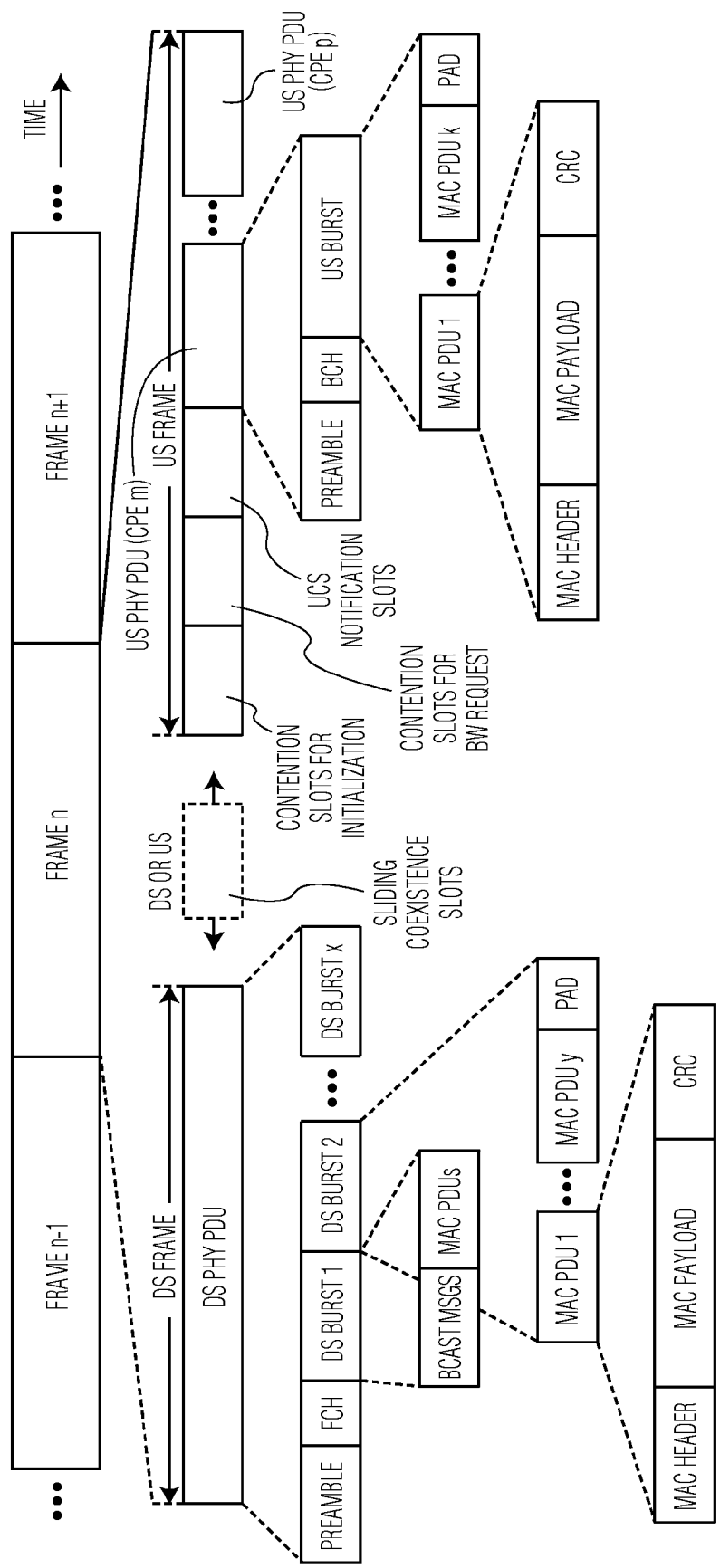
FIG. 3 illustrates an exemplary media access control (MAC) frame structure.

FIG. 3 illustrates one embodiment of a media access control (MAC) frame structure that may be used by the wireless communication networks 200. As can be seen in FIG. 3, BS 210 can schedule Sliding Coexistence Slots (SCS) anywhere in the frame structure, and these SCS would be used by the selected RSs 220 to transmit coexistence beacons.

The decision as to when to schedule coexistence beacons may be based on several factors, such as the interference level the network is currently experiencing. For example, RSs 220 experiencing high interference levels (above a given threshold) may be selected by BS 210 to send coexistence beacons, while those with low interference levels do not need to send any coexistence beacons. A simpler solution could be to periodically send coexistence beacons irrespective of anything else.

Another aspect of the CBP is the determination of the access mechanism during the SCS. Several access mechanisms could be selected, including contention-based and reservation-based. If the SCS follows a contention-based access scheme, then RSs 220 and/or BS 210 can use a contention access mechanism (e.g., based on the exponential backoff procedure) to gain access to the medium and transmit the coexistence beacon. Depending upon the scenario, a contention-based access mechanism may be preferred for sending coexistence beacons as it may maximize spectrum usage. This is due to the fact that, in the majority of cases, BS 210 will not schedule a single RS 220 to transmit beacons, but rather will attempt to improve coexistence by scheduling multiple RSs 220 to send beacons within the same SCS. In some applications, such as a WRAN, the BS 210 controls all accesses to the medium. Therefore, even though a contention-based access mechanism is used, the BS 210 may determine which RSs 220 participate in this contention. A reservation-based method for allocating and sending coexistence beacons can also be applied. In this case, the BS 210 could divide the SCS into slots which are big enough to carry a single coexistence beacon. Thus, in the process of managing the transmission of coexistence beacons, the BS 210 would assign a single RS 220 to each slot and in this way prevent any possibility for collision during the SCS. Clearly, there is a tradeoff between contention-based and reservation-based access mechanisms.

Beneficially, in order to maximize the probability that coexistence beacons are received from other wireless communication networks 200, an RS 220 does not stay locked (in physical layer synchronization terms) to its BS 210 at all times during a frame. Instead, RS 220 is only locked to its BS 210 whenever it is scheduled to receive/send data from/to BS 210. At all other times during the frame, RS 210 is listening to the medium for a coexistence beacon from an RS 220 of another wireless communication network 200. Thus, the probability of detection and radio resource usage efficiency of the CBP can be drastically increased. If needed, other means could also be used to significantly increase the efficiency of CBP. In case RS 220 loses synchronization with BS 210 while listening for and/or receiving a coexistence beacon, it can, for example, regain synchronization in the beginning of the following frame, which will cause few, if any, side effects.

It is important to note that to increase the effectiveness of the CBP, DS/US bandwidth allocations made by BS 210 to RSs 220 in a certain frame should not change for a number of consecutive frames. This guarantees that the information carried in coexistence beacons is valid for at least a reasonable duration of time, thus allowing enough time to the recipients of the coexistence beacon to implement self-interference mitigation mechanisms (discussed below). Also, beneficially, at any time when BS 210 needs to allocate bandwidth to an RS 220, it should seek to allocate this bandwidth based on the previous allocations (if any) to this same RS 220. By doing so, it will reduce the number of coexistence beacons that need to be transmitted by this RS 220, since its neighbors would already have the information regarding the allocations as these have not been changed by the BS 210.

Once an RS 220 receives coexistence beacons from other collocated RSs 220 belonging to different wireless communication networks 200 (henceforth referred to as "neighboring RS 220"), it can use this information in a variety ways in order to improve coexistence.

In general, RS 220 conveys coexistence information to its BS 210. The coexistence information is information produced by RS 220 from the traffic reservation information included in the coexistence beacon(s) received from neighboring RS(s) 220. The coexistence information can be as simple as an actual list of the one or more frequency channels and/or one or more time slots of the reservation requests that were included in the coexistence beacon(s) received from neighboring RS(s) 220. Alternatively, the coexistence information can be one or more traffic constraints indicating one or more frequency channels and/or one or more time slots which should not be used by BS 210 when assigning reservations to RS 220. As will be discussed in further detail below, such traffic constraints can be transmitted by RS 220 when making a reservation request of BS 210, or in response to a traffic constraint request message transmitted by BS 210 and received by RS 220.

For example, if an RS 220 receives coexistence beacons from neighboring RSs 220 (i.e. other interfering and nearby RSs 220 which, in this case, would be associated with some other BS(s) 210), it may be required to report this information to its associated BS 210, particularly if the received information indicates possible interference—e.g., overlap in time and frequency—with its own traffic reservations.

To this end, beneficially, specific management messages can be defined. Table 3 below presents one exemplary embodiment of a management message (e.g., MSR-REP) that can be used by RSs 220 to report to their BS 210 the reception of coexistence beacons from one or more other wireless communication networks 200. Tables 4-8 illustrate exemplary formats of various elements of the management message. The MSR-REP message shown in Table 3 can not only be used to report coexistence beacon information received from other neighboring RSs 220, but could also report information that is received from other neighboring BSs 210, as exemplified in Table 7 below.

TABLE 3

MSR-REP message format

| Syntax | Size | Notes |
|---|---|---|
| MSR-REP_Message_Format( ) { | | |
|   Management Message Type | 8 bits | Indicates the type of the message. In this case, it would be a measurement report message. |
|   Transaction ID | 16 bits | A possible ID of the transaction |
|   Report Elements | Variable | A collection of report elements. One embodiment off the format of a single measurement report element is shown in Table 4. |
| } | | |

TABLE 4

Single Measurement Message format

| Syntax | Size | Notes |
|---|---|---|
| Single_Measurement_Report_Format( ) { | | |
|   Element ID | 8 bits | |
|   Length | 8 bits | |
|   Transaction ID | 16 bits | |

TABLE 4-continued

Single Measurement Message format

| Syntax | Size | Notes |
|---|---|---|
| Report | Variable | A collection of Beacon Measurement Reports (BMR). One embodiment off the format of a single BMR is shown in Table 5. |
| } | | |

TABLE 5

Example of Beacon Measurement Report format

| Syntax | Size | Notes |
|---|---|---|
| Beacon_Measurement_Report_Format( ) { | | |
|   Element ID | 8 bits | |
|   Length | 8 bits | |
|   Report Mode | 4 bits | Table 6 |
|   Start Frame | 16 bits | Frame number in which the channel measurement started |
|   Duration | 16 bits | The duration of the measurement activity where the coexistence beacons were received |
|   Channel Number | 8 bits | The starting channel number where beacons have been received |
|   Number of Channels | 8 bits | The number of channels where beacons have been received |
|   FDC | 8 bits | The duration of a MAC frame |
|   FS | 7 bits | The number of MAC frames within a MAC superframe |
|   BS ID | 48 bits | ID/Address that uniquely identifies the BS |
|   BS/RS IEs | Variable | Table 7 and Table 8 |
| } | | |

TABLE 6

Beacon Measurement Report mode

| Syntax | Size | Notes |
|---|---|---|
| Report_Mode_Format( ) { | | |
|   Late | 1 bit | Indicates whether this RS is unable to carry out a measurement request because it received the request after the requested measurement time. The Late bit shall be set equal to 1 to indicate the request was too late. The Late bit shall be set to 0 to indicate the request was received in time for the measurement to be executed, or if no start time was specified. |
|   Incapable | 1 bit | Indicates whether this RS is incapable of generating this report previously requested by the BS. The Incapable bit shall be set to 1 to indicate the RS is incapable. The Incapable bit shall be set to 0 to indicate the RS is capable or the report is autonomous. |
|   Refused | 1 bit | Indicates whether this RS is refusing to generate this report previously requested by the BS. The Refused bit shall be set to 1 to indicate the RS is refusing. The Refused bit shall be set to 0 to indicate the RS is not refusing or the report is autonomous. |
|   Unmeasured | 1 bit | RS did not measure the channel |
| } | | |

TABLE 7

Base Station Information Element

| Syntax | Size | Notes |
|---|---|---|
| BS_IE_Format( ) { | | |
|   Element ID | 8 bits | |
|   Length | 8 bits | |
|   RCPI | 8 bits | Received Carrier Power Indicator (in dBm) |
|   Link Margin | 8 bits | In dBm |
| } | | |

TABLE 8

Remote Station Information Element

| Syntax | Size | Notes |
|---|---|---|
| RS_IE_Format( ) { | | |
|   Element ID | 8 bits | |
|   Length | 8 bits | |
|   Frame Number | 8 bits | The number of the MAC frame where the beacon was transmitted |
|   Frame Offset | 16 bits | Indicates the offset (in units of symbol duration) relative to the start of the first symbol of the PHY PDU (including preamble) where the current frame (i.e., the beacon itself) was transmitted. The time instants indicated by the Frame Offset values are the transmission times of the first symbol of the beacon including preamble (if present). |
|   RS ID | 48 bits | Address/ID that uniquely identifies the RS |
|   RCPI | 8 bits | See Table 7 |
|   Link Margin | 8 bits | See Table 7 |
|   Beacon IEs | Variable | A collection of Beacon IEs. For example, see Table 2 |
| } | | |

Once a BS 210 receives management (e.g., MSR-REP) messages from its associated RSs 220, it can use this information to implement interference mitigation mechanisms. In that case, beneficially BS 210 will implement an "interference-free" scheduling algorithm, which schedules the various US/DS traffic from/to RSs 220 in such a way that these allocations do not intersect (e.g., in time and frequency) with the allocations of their neighboring RSs 220. More specifically, once a BS 210 of a first wireless communication network 210 has obtained from its RS(s) 220 coexistence information pertaining to one or more traffic reservations of one or more RSs 220 of a second wireless communication network, BS 210 of the first wireless communication network 200 may select one or more parameters (e.g., frequency channels and/or time slots) of one or more traffic reservations for one or more RSs 220 of the first wireless communication network 200 based on the information about the one or more traffic reservations of the one or more RSs 220 of the second wireless communication network received via the coexistence beacon transmission, in order to minimize the possibility of interference from colliding data transmissions.

Other uses of the information contained in the coexistence beacon received from neighboring RS 220 are also possible. Indeed, once the coexistence information is available, many coexistence features can be supported.

For example, unlike existing wireless MAC protocols where clients (e.g., RSs 220) request bandwidth allocation (e.g., to the BS 210) with no coexistence information available, when an RS 220 has coexistence information pertaining to its neighboring RSs 220, it can use that coexistence information for bandwidth (traffic reservation) request purposes. In this case, RS 220 may include traffic constraints when requesting upstream bandwidth allocation to its BS 210, thus providing the coexistence information that BS 210 would need to avoid allocating resources for this RS 220 which interferes with other collocated RSs 220. More specifically, RS 220 may append traffic constraints together with its traffic reservation requests. Such traffic constraints may indicate at least one frequency channel or time period during which reservations with that RS 220 should not be scheduled, based on information received in a coexistence beacon of a neighboring RS 220 of another wireless communication network 200.

Table 9 illustrates an example of a bandwidth request (BWR) message from a RS 220 that may incorporate in its body a series of DS/US traffic constraints. These DS/US traffic constraints (depicted in Table 10) would allow an RS 220 to transmit a reservation request to BS 210 that also requests that its bandwidth allocation be subject to certain time and frequency exceptions, as indicated in Table 11 and Table 12 respectively. With this mechanism, the task of coexistence amongst collocated wireless communication networks 200 can be made both efficient and reliable.

TABLE 9

Bandwidth request (BWR) message format

| Syntax | Size | Notes |
|---|---|---|
| BWR_Format( ) { | | |
|   Type | 3 bits | Indicates the type of the bandwidth request header<br>000 = incremental<br>001 = aggregate |
|   BR | 21 bits | Bandwidth request<br>The number of bytes of upstream bandwidth requested by the RS. |
|   Length | 8 bits | Length of possible bandwidth allocation constraints IEs (see Table 10) relative to this request. |
| } | | |

TABLE 10

DS/US traffic constraint message format

| Syntax | Size | Notes |
|---|---|---|
| DS/US_Traffic_Constraint_Format( ) { | | |
|   Element ID | 8 bits | |
|   Length | 8 bits | |
|   US/DS | 1 bits | Indicates whether this is a US (set to 0) or DS (set to 1) constraint |
|   Class of Service (priority) | 3 bits | Indicates the priority of the traffic reservation |
|   Spectrum Usage Bitmap (SUB) | Variable | Compound of Time SUB (Table 11) and Frequency SUB (Table 12) |
| } | | |

TABLE 11

Time SUB message format

| Syntax | Size | Notes |
|---|---|---|
| Time_SUB_Format( ) { | | |
|   Type = 0 | 1 bit | Indicates whether this is a Time SUB (set to 0) or Frequency SUB (set to 1). |
|   Length | 8 bits | |
|   for (i = 1; i ≤ Number_Slots_Per_Frame; i++) | | |
|     Slot I | 1 bit | Set to 1, if slot i is currently in use. Set to 0, otherwise. |
| } | | |

TABLE 12

Frequency SUB message format

| Syntax | Size | Notes |
|---|---|---|
| Frequency_SUB_Format( ) { | | |
|   Type = 1 | 1 bit | Indicates whether this is a Time SUB (set to 0) or Frequency SUB (set to 1). |
|   Starting Channel Number | 8 bits | |
|   Number of Channels | 8 bits | |
| } | | |

Alternatively, the RS 220 may not automatically send anything to BS 210 in response to receiving a coexistence beacon. In that case, an alternative way for BS 210 to obtain the coexistence information from its associated RSs 220 is to specifically request it through management messages. That is, BS 210 would have to specifically send, for example, a management message to an RS 220 inquiring about any constraints that the RS 220 might have regarding airtime allocation Table 13 illustrates an exemplary embodiment of a traffic constraint request (TRC-REQ) message transmitted by a BS 210, whereas Table 14 presents an exemplary embodiment of the corresponding traffic constraint response (TRC-RSP) message sent by the RS 220. As we can see from these tables, the BS 210 has a high degree of flexibility in requesting various types of traffic constraints from RSs 220 (upstream, downstream, priority). Similarly, the RS 220 can provide the BS 210 a detailed report on its traffic constraints.

TABLE 13

TRC-REQ message format

| Syntax | Size | Notes |
|---|---|---|
| TRC-REQ_Message_Format( ) { | | |
|   Management Message Type | 8 bits | |
|   Transaction ID | 16 bits | |
|   Downstream | 1 bit | Indicates whether the BS is requesting downstream traffic constraints |
|   Upstream | 1 bit | Indicates whether the BS is requesting upstream traffic constraints |
|   Class of Service (priority) | 3 bits | The priority class of the traffic constraint being requested by the BS |
| } | | |

TABLE 14

TRC-RSP message format

| Syntax | Size | Notes |
|---|---|---|
| TRC-RSP_Message_Format( ) { | | |
|   Management Message Type | 8 bits | |
|   Transaction ID | 16 bits | |
|   DS/US Traffic Constraint Information Elements | Variable | A collection of traffic constraints (see Table 10) |
| } | | |

So, we see that an RS 220 of a first wireless communication network 200 may communicate to its BS 210 in a variety of ways any information it has received via a beacon transmission from an RS 220 of a second communication network 200. In one case, RS 220 of the first wireless communication network 200 may automatically send a management message (MSR-REP) to its BS 210 including information about one or more traffic reservations of the RS 220 of the second wireless communication network. In another case, RS 220 of the first wireless communication network 200 may include information about one or more traffic reservations of the RS 220 of the second wireless communication network when RS 220 of the first wireless communication network 200 makes a traffic reservation request for its BS 210 (e.g., as a traffic constraint). And in still another case, RS 220 of the first wireless communication network 200 may transmit to its BS a traffic response message in response to a traffic constraint request message transmitted to it by its BS 210.

The discussion above has focused on a wireless communication network 200 having a centralized architecture formed by a BS 210 and RSs 220 as shown in FIG. 2. However, the CBP easily can be generalized to a distributed access network. For example, in a distributed wireless communication network, all RS 220 could periodically send coexistence beacons that would allow neighboring RSs 220 in the same wireless communication network 200 to receive the coexistence information.

Also, while the discussion above with respect to the arrangement of FIG. 2 has focused on coexistence beacon transmissions that are transmitted over the air by RSs 220 themselves, it should be noted that, alternatively, the CBP can also be employed using a wired backbone which connects multiple BSs 210, provided each BS 210 knows the location information of its associated RSs 220. In that case, beneficially a BS 210 of a first wireless communication network 200 may transmit (e.g., over the backbone) a coexistence beacon including information about one or more traffic reservations of one or more RSs 220 (typically, all of the RSs 220) of the first wireless communication network 200. A BS 210 of a second wireless communication network 200 may receive the coexistence beacon transmitted from BS 210 of the first wireless communication network 200. In response thereto, and based on the information about the one or more traffic reservations of the RS(s) 220 of the first wireless communication network, BS 210 of the second wireless communication network 200 may select one or more parameters (e.g., frequency channels and/or time slots) of one or more traffic reservations for one or more RSs 220 of the second wireless communication network 200 to minimize the possibility of interference from colliding data transmissions.

Furthermore, it should be understood in the case shown in FIG. 2, an RS 220 may receive coexistence beacons from two or more other wireless communication networks 200, and its corresponding BS 210 may coordinate the information received about these multiple other wireless communication networks 200 to select parameters for traffic reservations with its RSs 220 to minimize the possibilities of interference from colliding data transmissions with all of the other wireless communication networks.

The methods described above permit multiple collocated wireless communication networks to coordinate resource reservation and hence operate more efficiently. The CBP protocol, which uses the concept of coexistence beacons, can operate either over the air interface or over a wired backbone between base stations in a case where such an infrastructure is available. Several mechanisms for reporting the beacon measurements are introduced. Furthermore, traffic constraint mechanisms enable remote stations to request bandwidth reservations subjected to certain constraints. It should be understood that the CBP is a best-effort protocol based on coexistence beacon transmissions. However, depending on the network design, successful delivery of coexistence beacon transmissions can be made with very high probability.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method for improving self-coexistence of wireless communication networks, the method comprising:
   listening for a coexistence beacon at a first station of a first wireless communication network using a reservation-based protocol;
   transmitting the coexistence beacon by a second station of a second wireless communication network using the reservation-based protocol;
   receiving the coexistence beacon at the first station, the coexistence beacon including a traffic reservation by the second station made in the second wireless communication network; and
   transmitting a bandwidth request from the first station to a base station of the first wireless communication network, the bandwidth request comprising coexistence information based on the traffic reservation included in the coexistence beacon, wherein the first station is located within proximity to the second station such that a frequency channel or a transmission time of the first station and the second station overlap.

2. The method of claim 1, wherein the first station listens for the coexistence beacon during a time period when the first station is not scheduled to send or receive data in the first wireless communication network, and does not listen for the coexistence beacon during a time period when the first station is scheduled to send or receive data in the first wireless communication network.

3. The method of claim 1, wherein the first station is a remote station.

4. The method of claim 3, further comprising appending traffic constraint data to the bandwidth request, the traffic constraint data being based on the traffic reservation included in the coexistence beacon.

5. The method of claim 1, wherein the traffic reservation in the coexistence beacon includes a channel number of the traffic reservation and a time period of the traffic reservation within a frame.

6. The method of claim 1, wherein the coexistence information includes at least one traffic constraint on the bandwidth request, wherein the traffic constraint indicates at least one frequency channel or time period during which bandwidth allocation should not be scheduled based on the information contained in the coexistence beacon.

7. A system for improving self-coexistence of wireless communication networks, comprising:
   a base station of a first wireless communication network using a reservation-based protocol;

a first station of the first wireless communication network, the first station listening for a coexistence beacon; and a second station of a second wireless communication network using the reservation-based protocol, wherein the second station is located within proximity to the first station such that a frequency channel or a transmission time of the first station and the second station overlap, the second station transmitting a coexistence beacon to the first station, the coexistence beacon including a traffic reservation by the second station made in the second wireless communication network, and wherein the first station transmits a bandwidth request to the base station, the bandwidth request comprising coexistence information based on the traffic reservation included in the coexistence beacon.

8. The system of claim 7, wherein the first station listens for the coexistence beacon during a time period when the first station is not scheduled to send or receive data in the first wireless communication network, and wherein the first station does not listen for the coexistence beacon during another time period when the first station is scheduled to send or receive data in the first wireless communication network.

9. The system of claim 7, wherein the first station is a remote station.

10. The system of claim 9, wherein the first station appends traffic constraint data to the bandwidth request, the traffic constraint data being based on the traffic reservation included in the coexistence beacon.

11. The system of claim 7, wherein the traffic reservation in the coexistence beacon includes a channel number of the traffic reservation and a time period of the traffic reservation within a frame.

12. The system of claim 7, wherein the coexistence information includes at least one traffic constraint on the bandwidth request, wherein the traffic constraint indicates at least one frequency channel or time period during which bandwidth allocation should not be scheduled based on the information contained in the coexistence beacon.

* * * * *